United States Patent
Hu et al.

(10) Patent No.: US 11,455,822 B2
(45) Date of Patent: Sep. 27, 2022

(54) IMAGE CAPTURING APPARATUS AND ELECTRONIC DEVICE

(71) Applicant: Shanghai Harvest Intelligence Technology Co., Ltd., Shanghai (CN)

(72) Inventors: Xueke Hu, Shanghai (CN); Tianyang Wang, Shanghai (CN); Fei Wang, Shanghai (CN); Sheng Feng, Shanghai (CN); Fengjun Gu, Shanghai (CN); Jiandong Huang, Shanghai (CN)

(73) Assignee: Shanghai Harvest Intelligence Technology Co., Ltd., Shanghai (CN)

( * ) Notice: Subject to any disclaimer, the term of this patent is extended or adjusted under 35 U.S.C. 154(b) by 367 days.

(21) Appl. No.: 16/712,842

(22) Filed: Dec. 12, 2019

(65) Prior Publication Data

US 2020/0193123 A1    Jun. 18, 2020

(30) Foreign Application Priority Data

Dec. 12, 2018  (CN) .......................... 201811516542.9

(51) Int. Cl.
| | |
|---|---|
| *G06V 40/13* | (2022.01) |
| *H04N 5/225* | (2006.01) |
| *G03B 11/04* | (2021.01) |
| *H04N 5/232* | (2006.01) |

(52) U.S. Cl.
CPC ........ *G06V 40/1318* (2022.01); *G03B 11/045* (2013.01); *H04N 5/2253* (2013.01); *H04N 5/2254* (2013.01); *H04N 5/232125* (2018.08)

(58) Field of Classification Search
CPC ............ G06V 40/1318; G06V 10/141; G06V 10/147; G03B 11/045; G03B 15/03; H04N 5/2253; H04N 5/2254; H04N 5/232125; H04N 5/2251
See application file for complete search history.

(56) References Cited

U.S. PATENT DOCUMENTS

| | | | |
|---|---|---|---|
| 2019/0026527 A1* | 1/2019 | He ....................... | G02B 6/0026 |
| 2019/0228204 A1* | 7/2019 | Park ................... | G06V 40/1324 |

* cited by examiner

*Primary Examiner* — Premal R Patel
(74) *Attorney, Agent, or Firm* — Harness, Dickey & Pierce, P.L.C.

(57) ABSTRACT

An image capturing apparatus and an electronic device are provided. The image capturing apparatus includes: a light-transmitting cover plate, a light source component, a sensor component, and a lens disposed between the light source component and the sensor component. A preset angle is formed between a central axis of the lens and a normal of the light source component. A light generated by the light source component is transmitted through the light-transmitting cover plate, and then is scattered by the object to be captured, and the scattered light is focused by the lens to the sensor component. The light source component is disposed outside of a depth of field of the lens, and the object to be captured is disposed within the depth of field of the lens.

11 Claims, 3 Drawing Sheets

IMAGE CAPTURING APPARATUS AND ELECTRONIC DEVICE

The present application claims the priority to Chinese Patent Application No. 2018115165429, titled "IMAGE CAPTURING APPARATUS AND ELECTRONIC DEVICE", filed on Dec. 12, 2018 with the Chinese Patent Office, which is incorporated herein by reference in its entirety.

FIELD

The present disclosure relates to the technical field of optical devices, and in particular to an image capturing apparatus and an electronic device.

BACKGROUND

The biological feature recognition technology plays an more and more important role in the field of information security. The fingerprint recognition technology has been one of key technical means for identity identification and equipment unlocking, which is widely used in the field of mobile internet.

Under the trend of increasing screen-to-body ratio of equipment, conventional capacitive fingerprint recognition cannot meet the requirements. Ultrasonic fingerprint recognition has problems of low technology maturity and high cost. Optical fingerprint recognition is expected to be a mainstream technical solution for under-screen fingerprint recognition.

In the existing optical fingerprint imaging solution, an image of an object to be captured is captured according to the geometric optical imaging principle. With the existing optical fingerprint imaging solution, a clear image may be obtained in some cases. However, in the case of a "dry finger", the existing optical fingerprint capturing solution cannot lead to a clear and complete fingerprint images of the dry finger.

SUMMARY

The technical problem to be solved by the present disclosure is how to improve a signal-to-noise ratio of an image capturing apparatus, so as to realize an off-screen detection on an object to be captured.

In order to solve the above problem, an image capturing apparatus is provided according to an embodiment of the present disclosure. The image capturing apparatus includes a light-transmitting cover plate, a light source component, a sensor component, and a lens. The light-transmitting cover plate includes a first face and a second face opposite to each other, the first face of the light-transmitting cover plate being adapted to be in contact with an object to be captured. The light source component includes a first face and a second face opposite to each other, the first face of the light source component being attached to the second face of the light-transmitting cover plate. The sensor component is disposed below the second face of the light source component. The lens is disposed between the light source component and the sensor component, a preset angle being formed between a central axis of the lens and a normal of the light source component, where the normal of the light source component is parallel to a direction from the first face of the light source component to the second face of the light source component. A light generated by the light source component is transmitted through the light-transmitting cover plate, and then is scattered by the object to be captured, and the scattered light is focused by the lens to the sensor component. The light source component is disposed outside of a depth of field of the lens, and the object to be captured is disposed within the depth of field of the lens.

In some embodiments, the object to be captured being disposed within the depth of field of the lens includes that: a portion of the object to be captured, whose distance to the first face of the light-transmitting cover plate is less than a preset distance, is within the depth of field of the lens.

In some embodiments, the light source component being disposed outside of the depth of field of the lens includes that: a maximum distance between the light source component and the lens is less than a minimum imaging range of the lens.

In some embodiments, a normal of the sensor component is parallel to the normal of the light source, where the normal of the sensor component is parallel to a direction from the first face of the sensor component to the second face of the sensor component.

In some embodiments, the preset angle is formed between a normal of the sensor component and the central axis of the lens, where the normal of the sensor component is parallel to a direction from the first face of the sensor component to the second face of the sensor component.

In some embodiments, a normal of the sensor component is parallel to the central axis of the lens, where the normal of the sensor component is parallel to a direction from the first face of the sensor component to the second face of the sensor component.

In some embodiments, the distance between the sensor component and the light source component is determined based on a focal length of the lens.

In some embodiments, the preset angle is in a range of 5 degrees to 30 degrees.

In some embodiments, the light source component includes a display panel.

In some embodiments, the display panel is selected from a liquid crystal display, an active array organic light emitting diode display and a micro light emitting diode display.

An electronic device is further provided according to the present disclosure. The electronic device includes the above image capturing apparatus, and a processor coupled to the image capturing apparatus and configured to receive an image of the object to be captured which is captured by the image capturing apparatus.

Compared with the conventional technology, the technical solutions according to the embodiments of the present disclosure have the following beneficial effects.

The image capturing apparatus provided according to an embodiment of the present disclosure includes a light-transmitting cover plate, a light source component, a sensor component, and a lens. The light-transmitting cover plate includes a first face and a second face opposite to each other, the first face of the light-transmitting cover plate being adapted to be in contact with an object to be captured. The light source component includes a first face and a second face opposite to each other, the first face of the light source component being attached to the second face of the light-transmitting cover plate. The sensor component is disposed below the second face of the light source component. The lens is disposed between the light source component and the sensor component, a preset angle being formed between a central axis of the lens and a normal of the light source component, where the normal of the light source component is parallel to a direction from the first face of the light source component to the second face of the light source component.

A light generated by the light source component is transmitted through the light-transmitting cover plate, and then is scattered by the object to be captured, and the scattered light is focused by the lens to the sensor component. The light source component is disposed outside of a depth of field of the lens, and the object to be captured is disposed within the depth of field of the lens.

In this way, the signal-to-noise ratio of the image capturing apparatus can be greatly improved according to the image capturing apparatus, so as to realize an off-screen detection for the object to be captured. Specifically, the preset angle is formed between the central axis of the lens and the normal of the light source component, which can realize non-uniform illumination. Compared with the existing imaging solution with uniform illumination, the signal-to-noise ratio can be improved, so that the image formed by the transmitted light irradiating the portion of the object to be captured that is not in contact with the light-transmitting cover plate can be detected, thereby obtaining an image of the portion of the object to be captured that is not in contact with the light-transmitting cover plate. Further, by adjusting the distance between the light source component and the lens, the image of the light source component itself formed through the lens is a virtual image (or no image of the light source component is formed), thereby minimizing the influence of the light source component on the effect of image capturing. Further, by adjusting the distance between the light-transmitting cover plate and the lens to ensure that the object to be captured is disposed within the depth of field of the lens, the image of the object captured through the lens is a clear image, thereby realizing the image capturing on the object to be captured.

Further, the preset angle is formed between the normal of the sensor component and the central axis of the lens. The normal of the sensor component is parallel to the direction from the first face of the sensor component to the second face of the sensor component. In this way, the quality of an image form on the sensor component by the light focused by the lens can be improved.

DETAILED DESCRIPTION OF EMBODIMENTS

As described in the background, the existing fingerprint capturing apparatus has many disadvantages, and especially in the case of capturing a fingerprint of a dry finger, the captured fingerprint image has low definition.

The "dry finger" herein refers to a finger with a shallow skin pattern on the finger pulp, a finger with a high dryness, a finger with insufficient sebum secretion or the like, a captured fingerprint image of which has a light and thin fingerprint pattern and thus has low definition.

For example, the fingerprint pattern of a finger with insufficient sebum secretion is harder than that of a finger with normal sebum secretion. When the finger with insufficient sebum secretion presses on a fingerprint collector, the contact area between the fingerprint pattern (such as the fingerprint ridge) and a fingerprint capturing screen of the fingerprint collector does not vary with the finger pressing force, which results in light and thin lines in the captured fingerprint image. Therefore the whole image is unclear.

Figure 1:
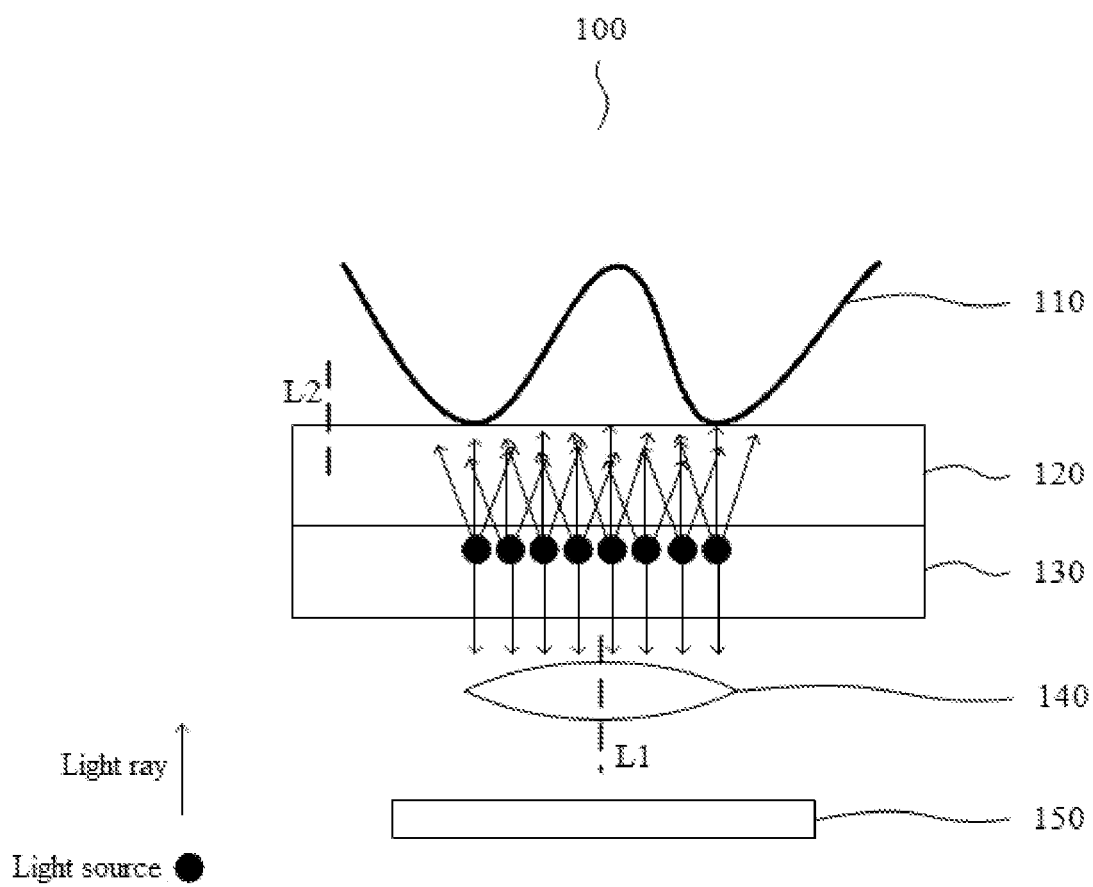
FIG. 1 is a schematic diagram showing the existing optical fingerprint imaging.

The structure of an existing image capturing apparatus is shown in FIG. 1. From top to bottom, the image capturing apparatus 100 sequentially includes: a light-transmitting cover plate 120, a light source plate 130, a lens 140 and a sensor 150. A central axis L1 of the lens 140 is parallel to a normal L2 of the light-transmitting cover plate 120. The light emitted from the light source plate 130 is partially downward irradiated and partially upward irradiated. In a region where an object to be captured 110 is not in contact with the light-transmitting cover plate 120, a part of the upward irradiated light is directly reflected by the light-transmitting cover plate 120 and another part of the upward irradiated light enters the air after passing through the light-transmitting cover plate 120, and then is scattered by the object to be captured 110. A small part of the scattered light returns into the light-transmitting cover plate 120 from a region where the object to be captured 110 is in contact with the light-transmitting cover plate 120. In the region where the object to be captured 110 is in contact with the light-transmitting cover plate 120, most of the upward irradiated light are scattered by the object to be captured 110. The two different light paths lead to different light intensities of light entering the sensor 150, which form a fingerprint image.

It is discovered that the existing image capturing apparatus 100 has a low signal-to-noise ratio. Specifically, in the existing imaging structure with uniform illumination, the light emitted directly downward from the light source plate 130 has an impact on the image generated by the light that is emitted upward from the light source plate 130 and reflected by the light-transmitting cover plate 130 and scattered by the object to be captured and then passes through the lens 140. It is discovered that in the existing image capturing apparatus 100, no more than 4% of the upward light can be reflected, and a small part of the reflected light can successfully pass through the lens 140 to form an image on the sensor 150. Thus, the light passing through the light-transmitting cover plate 120 and scattered by the object to be captured is difficult to form an effective fingerprint image on the sensor 150 due to factors such as a dry finger.

Thus, the existing image capturing apparatus only images a portion of the object to be captured (such as a finger) that is in a good contact, i.e., the portion that is in a sufficient contact with the light-transmitting cover plate of the image capturing apparatus by pressing. Therefore, a fingerprint image of a dry finger captured by the image capturing apparatus has a low definition, because the contact area between the dry finger and the light-transmitting cover plate is small.

In order to solve the above problem, an image capturing apparatus is provided according to an embodiment of the present disclosure. The image capturing apparatus includes a light-transmitting cover plate, a light source component, a sensor component and a lens. The light-transmitting cover plate includes a first face and a second face opposite to each other. The first face of the light-transmitting cover plate is adapted to be in contact with an object to be captured. The light source component includes a first face and a second face opposite to each other. The first face of the light source component is attached to the second face of the light-transmitting cover plate. The sensor component is disposed below the second face of the light source component. The lens is disposed between the light source component and the sensor component. A preset angle is formed between a central axis of the lens and a normal of the light source component. The normal of the light source component is parallel to a direction from the first face of the light source component to the second face of the light source component. A light generated by the light source component is transmitted through the light-transmitting cover plate, and then is scattered by the object to be captured, and the scattered light is focused by the lens to the sensor component. The light source component is disposed outside of a depth of field of the lens, and the object to be captured is disposed within the depth of field of the lens.

In this way, the signal-to-noise ratio of the image capturing apparatus can be greatly improved, so as to realize an off-screen detection for the object to be captured. Specifically, the preset angle is formed between the central axis of the lens and the normal of the light source component, which can realize non-uniform illumination. Compared with the existing imaging solution with uniform illumination, the signal-to-noise ratio can be improved, so that the image formed by the transmitted light irradiating the portion of the object to be captured that is not in contact with the light-transmitting cover plate can be detected, thereby obtaining an image of the portion of the object to be captured that is not in contact with the light-transmitting cover plate. Further, by adjusting the distance between the light source component and the lens, the image of the light source component itself formed through the lens is a virtual image (or no image of the light source component is formed), thereby minimizing the influence of the light source component on the effect of image capturing. Further, by adjusting the distance between the light-transmitting cover plate and the lens to ensure that the object to be captured is disposed within the depth of field of the lens, the image of the object to be captured that is formed through the lens is a clear image, thereby realizing the image capturing on the object to be captured.

In order to make the above objects, features and beneficial effects of the present disclosure more clear and better understood, specific embodiments of the present disclosure is described in detail below in conjunction with the drawings.

Figure 2:
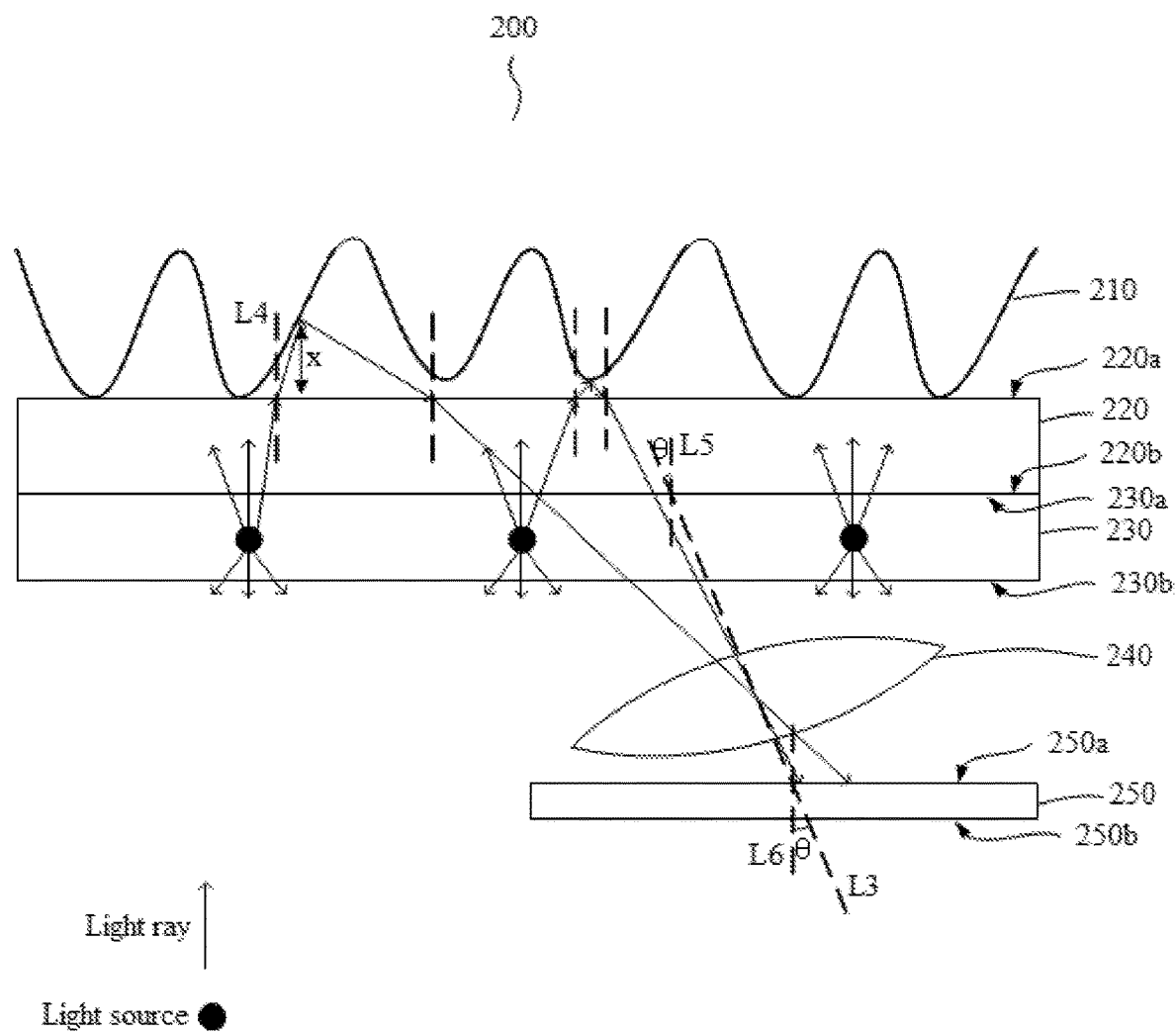
FIG. 2 is a schematic diagram of an image capturing apparatus according to an embodiment of the present disclosure.

FIG. 2 is a schematic diagram of an image capturing apparatus according to an embodiment of the present disclosure. The solution according to this embodiment can be applied to a fingerprint capturing scenario.

In this embodiment, an image capturing apparatus 200 may include: a light-transmitting cover plate 220 including a first face 220a and a second face 220b opposite to each other, the first face 220a of the light-transmitting cover plate 220 plate being adapted to be in contact with an object to be captured 210.

For example, the object to be captured may be a finger.

In an embodiment, the light-transmitting cover plate 220 may be in a single layer structure or a multilayer structure. The light-transmitting cover plate 220 in the single layer structure may be a glass cover plate or an organic light-transmitting cover plate. The light-transmitting cover plate 220 in the single layer structure may also be a cover plate with other functions, such as a touch screen. The light-transmitting cover plate 220 in the multilayer structure may be a multilayer glass cover plate or a multilayer organic light-transmitting cover plate or a combination of the glass cover plate and the organic light-transmitting cover plate.

The image capturing apparatus 200 may further include: a light source component 230 including a first face 230a and a second face 230b opposite to each other, the first face 230a of the light source component 230 being attached to the second face 220b of the light-transmitting cover plate 220.

In an embodiment, the light source component 230 may be multiple light sources arranged on a board.

In an embodiment, the light source component 230 may be a display panel, such as a liquid crystal display, an active array organic light emitting diode display or a micro light emitting diode display.

The light source component 230 may include multiple light sources, which may be a point light source, a line light source or a light source with other topology structures.

Further, the image capturing apparatus 200 may further include a sensor component 250 disposed below the second face 230b of the light source component 230.

The term "below" means in a direction from the first face 230a of the light source component 230 to the second face 230b of the light source component 230. In other words, from top to bottom, the image capturing apparatus 200 sequentially includes: a light-transmitting cover plate 220, a light source component 230, a lens 240 and a sensor component 250. When an object to be captured 210 contacts the first face 220a of the light-transmitting cover plate 220 from the top, the image capturing apparatus 200 captures an image of the object to be captured 210.

In an embodiment, the sensor component 250 may be configured to acquire light and may include multiple photosensitive units (not shown in FIG. 2).

In an embodiment, the sensor component 250 may be arranged below the light source component 230. The light may enter the sensor component 250 through the gap between light sources on the light source component 230.

Further, the image capturing apparatus 200 may further include a lens 240 disposed between the light source component 230 and the sensor component 250.

In an embodiment, the distance between the sensor component 250 and the light source component 230 is determined based on a focal length of the lens 240. The distance between the sensor component 250 and the light source component 230 refers to an average distance between the sensor component 250 and the light source component 230.

In an embodiment, the focal length of the lens 240 may be as small as possible. In this way, the image formed on the sensor component is small, thereby reducing the cost of the sensor component 250.

Further, a normal L5 of the light source component 230 may be parallel to a normal L4 of the light-transmitting cover plate 220. The normal L5 of the light source component 230 is parallel to a direction from the first face 230a of the light source component 230 to the second face 230b of the light source component 230, and the normal L4 of the light-transmitting cover plate 220 is parallel to a direction from the first face 220a of the light-transmitting cover plate 220 to the second face 220b of the light-transmitting cover plate 220. In other words, the light-transmitting cover plate 220 and the light source component 230 may be arranged in parallel with each other.

Further, a preset angle θ may be formed between a central axis L3 of the lens 240 and the normal L5 of the light source component 230. In this way, non-uniform illumination is formed, so as to reduce the influence on the sensor component 250 caused by the light irradiated downward from the light source component 230, thereby improving the signal-to-noise ratio of the image capturing apparatus 200.

In an embodiment, the preset angle θ is in a range of 5 degrees to 30 degrees.

Further, the light emitted from the light source component 230 is transmitted through the light-transmitting cover plate 220 and then is scattered by the object to be captured 210, and the scattered light is focused by the lens 240 to the sensor component 250. In this way, by adjusting the preset angle of the lens 240, an image formed by the transmitted light that irradiates the portion of the object to be captured that is not in contact with the light-transmitting cover plate can be detected by the sensor component 250.

Further, the light source component 230 is disposed outside of a depth of field of the lens 240 and the object to be captured 210 is disposed within the depth of field of the lens 240.

In an embodiment, the object to be captured 210 being disposed within the depth of field of the lens may mean that: a portion of the object to be captured, whose distance to the first face of the light-transmitting cover plate is less than a preset distance, is within the depth of field of the lens 240. In this way, it is ensured that, a clear image for each portion of the object to be captured within the preset distance x can be formed on the sensor component 250 through the lens 240.

In an embodiment, the preset distance x may be 0 mm to 1 mm.

In this way, with the solution of this embodiment, in a region in which the object to be captured 210 is in contact with the light-transmitting cover plate 220, the light emitted from the light source component 230 and scattered by the object to be captured 210 forms an image on the sensor component 250.

Also, in a region in which the object to be captured 210 is not in contact with the light-transmitting cover plate 220, the portion of the object to be captured 210 having a distance less than the preset distance x to the first face 220a of the light-transmitting cover plate 220 can be irradiated by the light transmitted through the light-transmitting cover plate 220. The irradiating light is scattered and then is also focused by the lens 240 to form an image on the sensor component 250.

In this way, an off-screen detection on the object to be captured 210 can be realized, and the imaging area for the object to be captured 210 can be increased.

In an embodiment, the light source component 230 being disposed outside of the depth of field of the lens 240 may mean that: a maximum distance between the light source component 230 and the lens 240 is less than a minimum imaging range of the lens 240. In this way, it is ensured that the image of the light source component 230 formed on the sensor component 250 through the lens 240 is a virtual image (or no image of the light source component is formed), thereby effectively reducing the influence of the light source component 230 on the imaging result.

In an embodiment, a normal L6 of the sensor component 250 may be parallel to the normal L5 of the light source component 230, that is, the preset angle θ may also be formed between the normal L6 of the sensor component 250 and the central axis L3 of the lens 240. The normal L6 of the sensor component 250 may be parallel to a direction from a first face 250a of the sensor component 250 to a second face 250b of the sensor component 250. In other words, the light-transmitting cover plate 220, the light source component 230 and the sensor component 250 may be arranged in parallel with each other.

Figure 3:
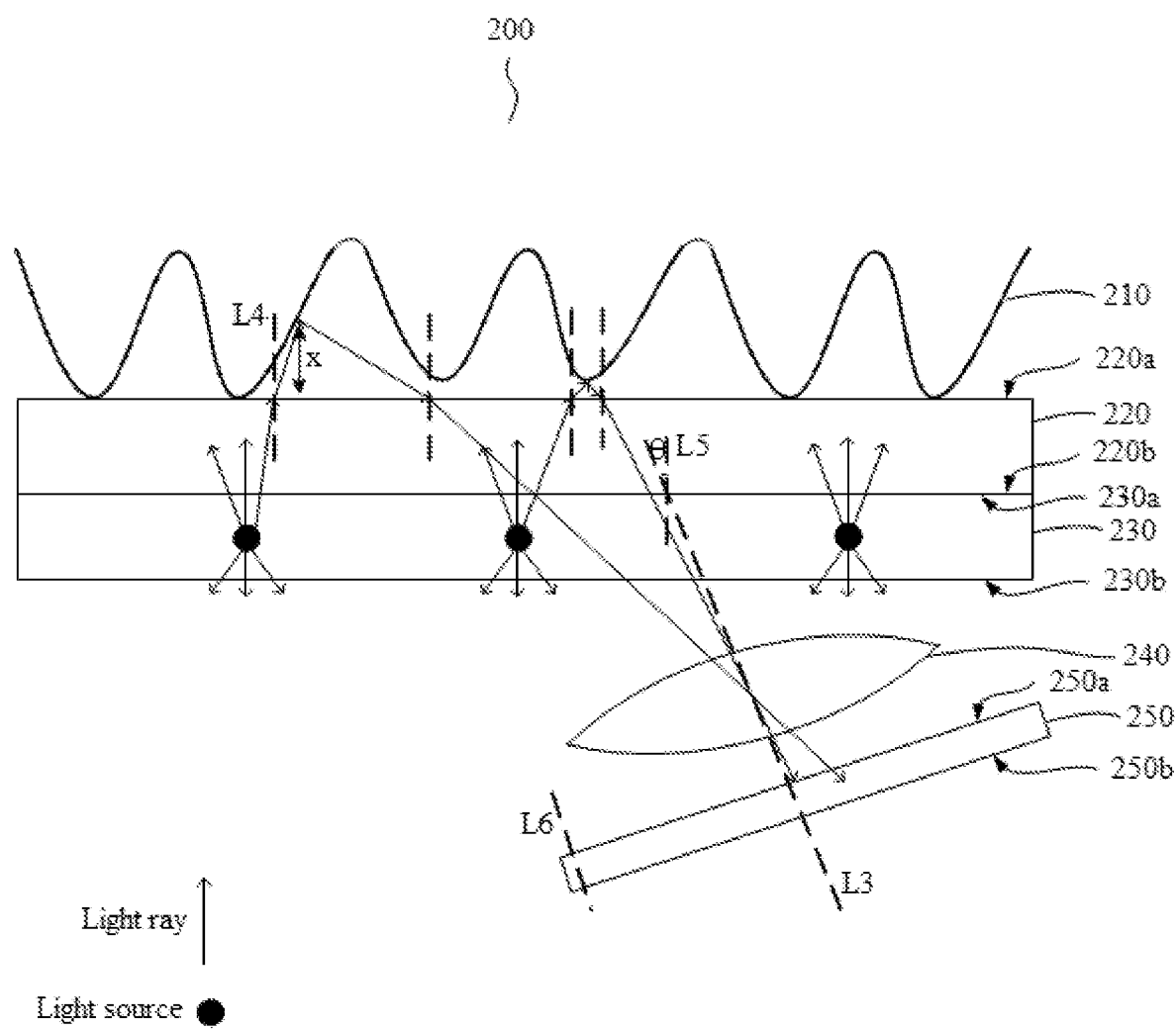
FIG. 3 is a schematic diagram of another image capturing apparatus according to an embodiment of the present disclosure.

In another embodiment, referring to FIG. 3, a normal L6 of a sensor component 250 may be parallel to the central axis L3 of the lens 240. In this way, the quality of an image formed on the sensor component 250 by the light focused by the lens 240 can be improved.

An electronic device is provided according to an embodiment of the present disclosure. The electronic device may include the image capturing apparatus 200 as described with reference to FIG. 2 or FIG. 3 and a processor. The processor is coupled to the image capturing apparatus 200 and is configured to receive an image of the object to be captured 210 captured by the image capturing apparatus 200.

The technical solution is disclosed as above, but is not limited thereto. Those skilled in the art can make various changes and modifications without departing from the spirit and scope of the present disclosure. Therefore, the protection scope of the present disclosure is defined by the claims.

The invention claimed is:

1. An image capturing apparatus, comprising:
   a light-transmitting cover plate, comprising a first face and a second face opposite to each other, the first face of the light-transmitting cover plate being adapted to be in contact with an object to be captured;
   a light source component, comprising a first face and a second face opposite to each other, the first face of the light source component being attached to the second face of the light-transmitting cover plate;
   a sensor component, disposed below the second face of the light source component; and
   a lens, disposed between the light source component and the sensor component, a preset angle being formed between a central axis of the lens and a normal of the light source component, wherein the normal of the light source component is parallel to a direction from the first face of the light source component to the second face of the light source component;
   wherein a light generated by the light source component is transmitted through the light-transmitting cover plate, and then is scattered by the object to be captured, and the scattered light is focused by the lens to the sensor component,
   wherein a maximum distance between the light source component and the lens is less than a minimum imaging range of the lens.

2. The image capturing apparatus according to claim 1, wherein the object to be captured is disposed within the depth of field of the lens.

3. The image capturing apparatus according to claim 2, wherein the object to be captured being disposed within the depth of field of the lens comprises that:
   a portion of the object to be captured, whose distance to the first face of the light-transmitting cover plate is less than a preset distance, is within the depth of field of the lens.

4. The image capturing apparatus according to claim 1, wherein a normal of the sensor component is parallel to the normal of the light source component, wherein the normal of the sensor component is parallel to a direction from the first face of the sensor component to the second face of the sensor component.

5. The image capturing apparatus according to claim 1, wherein the preset angle is formed between a normal of the sensor component and the central axis of the lens, wherein the normal of the sensor component is parallel to a direction from the first face of the sensor component to the second face of the sensor component.

6. The image capturing apparatus according to claim 1, wherein a normal of the sensor component is parallel to the central axis of the lens, wherein the normal of the sensor component is parallel to a direction from the first face of the sensor component to the second face of the sensor component.

7. The image capturing apparatus according to claim 1, wherein a distance between the sensor component and the light source component is determined based on a focal length of the lens.

8. The image capturing apparatus according to claim 1, wherein the preset angle is in a range of 5 degrees to 30 degrees.

9. The image capturing apparatus according to claim 1, wherein the light source component comprises a display panel.

10. The image capturing apparatus according to claim 9, wherein the display panel is selected from a liquid crystal display, an active array organic light emitting diode display and a micro light emitting diode display.

11. An electronic device, comprising:
   the image capturing apparatus according to claim 1; and
   a processor, coupled to the image capturing apparatus and configured to receive an image of the object to be captured which is captured by the image capturing apparatus.

* * * * *